United States Patent [19]
Johnson et al.

[11] 3,914,327
[45] Oct. 21, 1975

[54] CATALYZED HALOGEN EXCHANGE PROCESS

[75] Inventors: Morris A. Johnson; Kang Yang, both of Ponca City, Okla.

[73] Assignee: Continental Oil Company, Ponca City, Okla.

[22] Filed: Aug. 20, 1973

[21] Appl. No.: 389,905

Related U.S. Application Data

[63] Continuation-in-part of Ser. No. 163,439, July 16, 1971, abandoned.

[52] U.S. Cl.............................................. 260/658 R
[51] Int. Cl.$^2$......................................... C07C 17/20
[58] Field of Search................................. 260/658 R

[56] References Cited
UNITED STATES PATENTS
3,799,999  3/1974  Gordon et al................... 260/658 R FOREIGN PATENTS OR APPLICATIONS
39-22947  10/1964  Japan.............................. 260/658 R

OTHER PUBLICATIONS

Calingaert et al. J. Am. Chem. Soc. 62 1545–1547 (1940).

*Primary Examiner*—D. Horwitz
*Attorney, Agent, or Firm*—Cortlan R. Schupbach, Jr.

[57] ABSTRACT

A halogen exchange process between bromoalkanes and alkyl chlorides may be conducted in the liquid phase in the presence of activated charcoal including activated carbon.

4 Claims, No Drawings

CATALYZED HALOGEN EXCHANGE PROCESS

This is a continuation-in-part of application Ser. No. 163,439, filed July 16, 1971, now abandoned.

This invention relates to a liquid phase halogen exchange process between bromoalkanes and alkylchlorides conducted in the presence of activated charcoal or activated carbon.

The use of activated carbon in chlorination and dehydrochlorination is well known. For example, it is known that methane can be chlorinated by passing a mixture of chlorine and methane through a contact mass consisting essentially of activated carbon and graphite.

Activated carbon has been used as a catalyst in the process of preparing trifluoromethyl fluoroformate and bistrifluoromethyl carbonate wherein carbonyl fluoride is contacted with said activated carbon catalyst. Also, activated charcoal has been used as a carrier for metal halide catalyst of the Friedel-Crafts type for the reaction of a halo-olefin with an isoparaffin. In addition, activated carbon has been used as a catalyst to effectuate the reaction between trifluoroacetyl chloride and trifluoroethanol vapors to produce trifluoroethyltrifluoroacetate.

It is further known that monochloromonobromomethane may be obtained by passing a mixture of methylene bromide and methylene chloride through a combusion tube in the vapor phase in the presence of activated carbon. While this process may be effective for single carbon atom compounds it is not suitable for use with multiple carbon atom compounds, e.g. two carbon atoms and above, due to other dominating reactions such as dehydrohalogenation.

In accordance with this invention it has been found that a halogen exchange reaction may be conducted with high yields between $C_2$-$C_{20}$ bromoalkanes and $C_2$-$C_{20}$ alkyl chlorides in the liquid phase in the presence of activated charcoal or activated carbon or mixtures of both.

The utility of the process can best be illustrated by the following reactions involved in preparing tetraalkyl lead compounds. At a lead cathode, the reduction of alkylbromide occurs readily producing alkyl lead compounds:

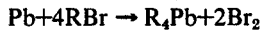
$$Pb + 4RBr \rightarrow R_4Pb + 2Br_2$$

The generated bromine reacts rapidly with ethylene as follows:

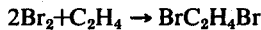
$$2Br_2 + C_2H_4 \rightarrow BrC_2H_4Br$$

When the present exchange reaction,

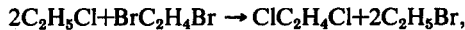
$$2C_2H_5Cl + BrC_2H_4Br \rightarrow ClC_2H_4Cl + 2C_2H_5Br,$$

is incorporated in the process loop, the following overall reaction can be accomplished.

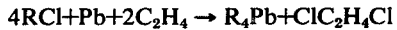
$$4RCl + Pb + 2C_2H_4 \rightarrow R_4Pb + ClC_2H_4Cl$$

In this overall reaction, expensive bromide is not consumed and chlorine is recovered as dichloroethane, a valuable intermediate for vinyl chloride.

The $C_2$-$C_{20}$ bromoalkanes which may be used in the process include mono- and di-bromo substituted paraffinic hydrocarbons having 2 to 20 carbon atoms provided that no more than one bromine atom is attached to any one carbon atom. Illustrative of these compounds are bromoethane; 1,2-dibromoethane; bromodecane; 1,2-dibromotetradecane; bromoheptane; bromopentane; bromohexadecane; 1,2-dibromotridecane, and the like. The alkylchlorides which may be used are defined by the formula RCl wherein R is an alkyl group having 2 to 20 carbon atoms. Illustrative of these compounds are ethylchloride, butylchloride, decylchloride, tetradecylchloride, heptadecylchloride, dodecylchloride, and the like.

The process is carried out with the reactants in the liquid phase, using pressure where necessary to maintain the liquid phase, at a wide range of temperatures in the presence of activated charcoal, activated carbon, or mixtures of both.

The upper temperature limit for this reaction is dependent only on the stability of reactants and products, and not on the catalyst, provided the reactants are maintained in the liquid phase. This is a decided advantage of this catalyst over others, for example, the quaternary ammonium and phosphonium salts. The preferred temperatures for operation of this catalyst range from ambient to about 300°C, and the most preferred temperatures are from about 100°C to about 200°C.

Ratios of reactants are not critical and may vary as desired. It is generally preferable to use an excess of one reactant in order to drive reaction of the other reactant more nearly to completion. Practical limits would indicate a mol ratio of from about 10:1 to about 1:10 of alkylchloride to bromoalkane. Other methods of driving the reaction to completion include the well-known methods of removing one product from the reaction mixture.

The activated carbon and activated charcoal catalysts are quite inexpensive, and economic considerations on upper limit of catalyst ratio is not as acute as in other processes. Activity is sufficiently high that large quantities are not necessary. Lower limits of catalyst are readily determinable and amounts as low as 0.1 wt. percent based on the total organic reactants may be used effectively. The upper limit is a practical one; simply the point where reactor size becomes unwieldy, or mechanical losses of product from simple physical capture become important. Amounts as great as 150 wt. percent based on the total organic reactants may be used.

The following examples further illustrate the process of this invention:

EXAMPLE 1

A solution of 54.60 g 1,2-dibromoethane (0.291 mol) and 23.00 g ethylchloride (0.356 mol) at 0°C was added to a 200 ml stainless steel autoclave chilled to 0°C, and containing 10 g activated charcoal and a magnetic stirring bar. The autoclave was sealed, then heated to 130°C in 15 minutes while the contents were magnetically stirred.

The reaction mixture was heated for an additional 30 minutes at 130°–150°C; pressure reached 180 psig. At the end of reaction time products were allowed to distill into a trap cooled to liquid nitrogen temperature. An internal standard of 2.5220 g n-octane had been previously placed in the tared trap. Most of the products had condensed into the trap after five minutes, and pressure had reduced to zero. The reactor was heated for an additional 55 minutes at 150°C to capture the last traces of 1,2-dibromoethane. The trap was sealed and weighed to give a physical recovery of 100 (±1.5) percent.

The product was slowly warmed to melting and an aliquot of the homogeneous solution was transferred to a septum stoppered bottle chilled in a dry ice-acetone bath. Gas chromatography using previously calibrated response factors with a digital integrator indicated the following yield:

18.60 g ethylbromide (0.169 mol)
2.67 g 1,2-dichloroethane (0.027 mol)
16.82 g 1-bromo-2-chloroethane (0.117 mol)
28.45 g 1,2-dibromoethane (0.151 mol)

This corresponds to a 100 (±1) percent recovery of Br and 100 (±1) percent recovery of ethylchloride reacted, as 1,2-dichloroethane, and 1-bromo-2-chloroethane.

Control experiments were run as described above without the presence of the charcoal catalyst. In each case where no charcoal catalyst was utilized the yield of products in the exchange reaction was, within experimental error, essentially zero.

EXAMPLE 2

Comparative experiments were conducted demonstrating the necessity of carrying out the process in the liquid phase as opposed to a vapor phase when employing bromoalkanes and alkylchlorides of multiple carbon atoms.

Liquid Phase Reaction

To a chilled 200 ml nickel autoclave there were added 54.6 g 1,2-dibromoethane, 23.0 g ethylchloride and 10.0 g activated charcoal. The autoclave was sealed and placed in a heated block and rotated at 200 rpm for about 30 minutes during which time the autoclave and contents reached 150°C and 250 psig. Under these conditions the organic reactants were still in the liquid phase. At the end of the 30 minute period the autoclave was vacuum distilled at 150°C for 1 hour into a tared freeze-trap cooled to liquid nitrogen temperature. The product yield was 66 g for an 85 percent material recovery with the following composition as determined by gas chromatography:

| | |
|---|---|
| ethylchloride | 38 mol. % |
| ethylbromide | 28 mol. % |
| 1,2-dibromoethane | 16 mol. % |
| 1,2-dichloroethane | 3.9 mol. % |
| 1-bromo-2-chloroethane | 15 mol. % |

Vapor Phase Reaction

The procedure described above was repeated except that only 2.73 g 1,2-dibromoethane and 1.15 g ethylchloride were employed along with the charcoal. Upon heating the reaction mixture to 150°C the pressure rose to 60 psig. The organic reactants were in the vapor phase under these conditions. After vacuum distillation and recovery the product yield was 0.52 g for a 13 percent material recovery with the following composition as determined by gas chromatography:

| | |
|---|---|
| ethylchloride | 31 mol. % |
| ethylbromide | 31 mol. % |
| 1,2-dibromoethane | 21 mol. % |
| 1,2-dichloroethane | 4.6 mol. % |
| 1-bromo-2-chloroethane | 3.2 mol. % |

Thus having described the invention in detail, it will be understood by those skilled in the art that certain modifications and variations may be made without departing from the spirit and scope of the invention as described herein and defined in the appended claims.

We claim:

1. A halogen exchange process comprising reacting a bromoalkane with an alkylchloride at temperatures ranging from ambient to 300°C in the liquid phase in the presence of activated charcoal, activated carbon, or mixtures of both, said bromoalkane being a mono- or di-bromo substituted paraffinic hydrocarbon having 2 to 20 carbon atoms provided that no more than one bromine atom is attached to any one carbon atom, and said alkylchloride being defined by RCl wherein R is an alkyl radical having 2 to 20 carbon atoms.

2. A process according to claim 1 wherein the bromoalkane is 1,2-dibromoethane and the alkylchloride is ethylchloride.

3. A process according to claim 2 wherein the mol ratio of ethylchloride to 1,2-dibromoethane is in the range of 10:1 to 1:10.

4. A process according to claim 2 wherein the reaction is conducted at temperatures in the range of 100°C to 200°C.

* * * * *